Nov. 10, 1964 C. E. CLIFFORD ETAL 3,156,624
NUCLEAR REACTOR SYSTEM
Filed Jan. 30, 1961 5 Sheets-Sheet 1

Fig 1

INVENTORS
CHARLES E CLIFFORD
HAROLD ROBERT ZEITLIN
KNUD ANTONSEN
By Soans, Anderson, Luedeka & Fitch.
ATTYS

United States Patent Office 3,156,624
Patented Nov. 10, 1964

3,156,624
NUCLEAR REACTOR SYSTEM
Charles E. Clifford and Harold Robert Zeitlin, Del Mar, and Knud Antonsen, San Diego, Calif., assignors to General Dynamics Corporation, New York, N.Y., a corporation of Delaware
Filed Jan. 30, 1961, Ser. No. 85,685
8 Claims. (Cl. 176—12)

The present invention relates to nuclear reactor systems and more particularly to a nuclear reactor system having a reactive core which is movable between two or more positions.

A nuclear reactor system generally includes a reactive core containing fuel (fissionable material), a moderating material, a reflector to conserve escaping neutrons, control and measuring elements, provision for heat removal, and suitable shielding.

An operating reactor contains more than the critical amount of fissionable fuel so that the effective multiplication factor (i.e., the ratio of the number of neutrons produced by fission in each generation to the number of neutrons present in the preceding generation) can be made greater than unity. Normally, the multiplication factor is controlled by the introduction into the reactor of one or more control rods which absorb neutrons in the reactor.

The power output of a reactor is proportional to the density of neutrons in the reactor. A change in power output can be readily caused either by withdrawing a control rod to make the multiplication factor greater than one, thereby increasing the power output, or by inserting a control rod to make the multiplication factor less than one, thereby decreasing the power output, and then, when the power reaches the desired level, moving the control rod sufficiently to restore the multiplication factor to one again. In a given reactor, the rate at which neutron density, and therefore power output, increases or decreases depends upon the amount by which the multiplication factor is greater or less, respectively, than unity.

Normally, in a reactor a sudden increase in reactivity (i.e., departure of the reactor from critical) unless instantaneously reduced, may increase the power of the reactor to a dangerous level. However certain reactors, such as the TRIGA reactor which is manufactured and sold by the assignee of this invention, are inherently safe, because they exhibit a large, prompt, negative temperature coefficient of reactivity (i.e., the reactivity decreases as the temperature of the fuel increases). One form of the TRIGA reactor is described in a co-pending application, Serial No. 732,415, filed on May 9, 1958, now U.S. Patent No. 3,127,325, issued on March 31, 1964.

Because of the large prompt negative temperature coefficient associated with such a reactor, the reactor power rises in a very short period to a maximum value when a step increase in reactivity is made by rapidly withdrawing the control rod, then quickly reverts down to a much lower steady power level by itself. This pulse of power in the reactor releases a considerable amount of energy.

The pulsing capabilities of such a reactor make it an attractive tool for research upon the effects of large radiation doses during short time exposures. For example, the reactor may be employed to study the effects of large neutron and gamma ray fluxes on living organisms, electronic instruments and other devices.

Such a reactor, whether operating at steady state power or pulsed power, may be employed for training purposes, research on the effects of radioactivity, isotope production, etc. Conventional reactors may also be used for certain of these purposes.

In certain applications, it is desirable to be able to move the reactive core to more than one position. The reactive core may be moved to a given position to provide, for example, radiation doses in an adjoining exposure room, and moved to another position for training purposes or for permitting entry into the exposure room, or for providing radiation doses of a different energy level in another adjoining exposure room, etc.

An object of the present invention is the provision of a nuclear reactor system having a reactive core which is movable between two or more positions. Another object of the invention is the provision of a nuclear reactor system for selectively irradiating objects with either thermal neutrons or unmoderated neutrons. A further object is the provision of a nuclear reactor system having a reactive core that is movable between spaced apart positions. A still further object is the provision of a nuclear reactor system capable of providing high neutron flux densities at two separate positions. A further object is the provision of a nuclear reactor for irradiating relatively large objects.

Other objects and advantages of the present invention will become apparent by reference to the following description and accompanying drawings.

In general, the reactor system shown in the drawings includes a reactive core which is supported in a tank for movement between two positions. The tank is filled with a suitable liquid, such as water, which serves as a reflector, moderator, coolant and radiation shield. Means are provided for moving the core to and from the respective positions.

Referring more particularly to the specific reactor system illustrated in the drawings, the reactor system includes a reactive core 10 disposed near the bottom of a reactor tank 12. The reactor tank 12 which is generally elliptical in horizontal outline, is disposed in a correspondingly shaped pit 14 in the ground so that effective shielding against radiation may be afforded without resorting to expensive above the ground shielding structures. The pit 14 may be constructed by the standard construction methods, with the pit being lined with concrete, steel or other strong reenforcing materials. In the reactor illustrated, the lining of the pit 14 is concrete. A horizontal shelf 16 is preferably provided in the upper end of the pit for the mounting of various control equipment described hereinafter.

The reactor tank 12 is filled with a suitable liquid which acts as a reflector, moderator, coolant and shield for the core. For these purposes either ordinary or heavy water is acceptable. Using water as a shield permits one to lower specimens into the reactor for irradiation and visually observe the core during reactor operation. The depth of the reactor tank 12 is controlled by the amount of shielding desired above the reactive core 10. Normally, 16 feet of ordinary water over the core 10 provides an adequate radiation shield.

The water that is used in the reactor tank should be substantially free of impurities, otherwise the activation of these impurities may be a hazard to operating personnel. Even though the water used is initially free from impurities, impurities such as products of corrosion, possible fuel element failure, foreign matter inadvertently dropped into the water, may be introduced. To remove these, a demineralizer (not shown) and a filter (not shown) may be provided externally of the tank. Suitable refrigeration means (not shown) is also provided externally of the tank for cooling the water.

All of the various structural members disposed within the reactor tank, and the reactor tank 12 itself, are preferably formed of non-corrodible, mutually compatible materials having a low neutron-capture cross section, such as aluminum or stainless steel.

The reactive core 10 of the reactor system may be of any suitable construction. However, the core 10 is preferably designed so that the reactor is inherently safe, i.e., the reactor will not be damaged by a sudden surge in neutron multiplication. In the illustrated embodiment the core 10 of the reactor is designed in combination with the remaining components of the reactor to have a high prompt negative temperature coefficient of reactivity. Such a reactor is described in the aforementioned co-pending application, Serial No. 732,415, now U.S. Patent No. 3,127,325, issued on March 31, 1964. Generally, the high prompt negative temperature coefficient of reactivity is obtained in the reactor by employing a solid homogeneous mixture of enriched uranium and zirconium hydride in the fuel element.

Figures 5, 6:
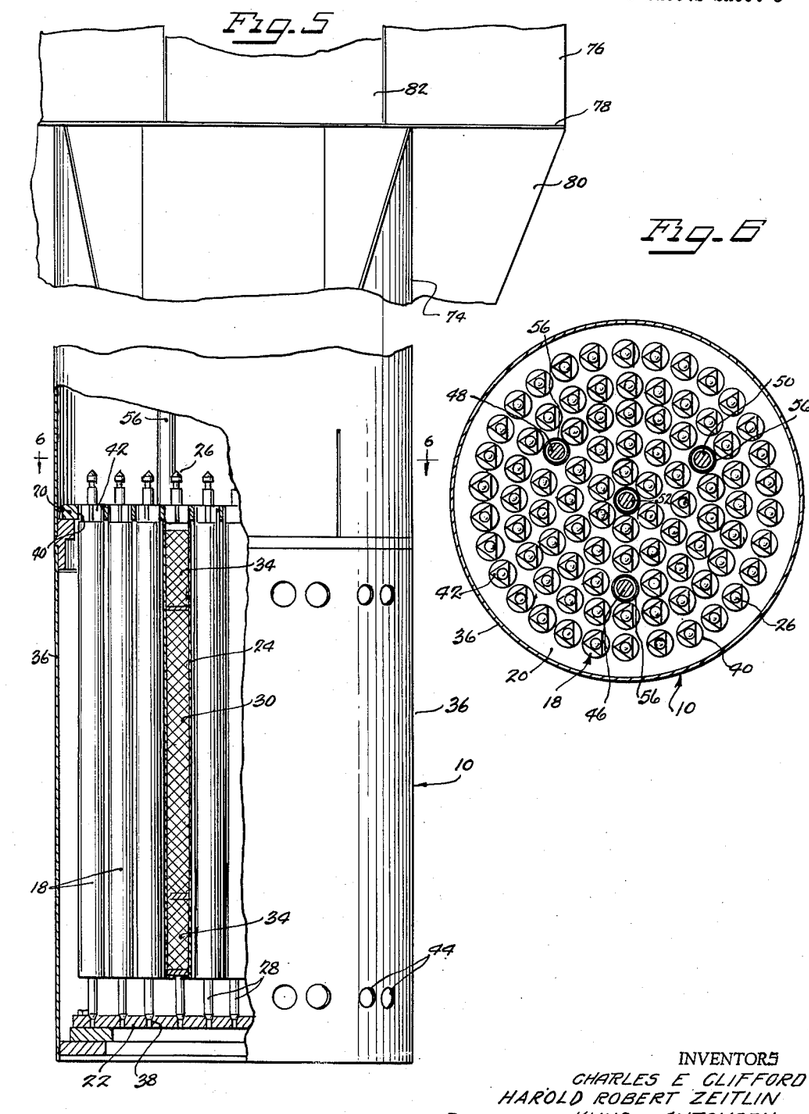
FIGURE 5 is an enlarged elevational view of the core of the reactor system shown in FIGURE 1, with portions being broken away to show certain features thereof.
FIGURE 6 is a horizontal cross section view taken generally along line 6—6 of FIGURE 5.

The core 10 of the illustrated reactor is in the general form of a right cylinder and includes a lattice of generally vertically extending fuel elements 18 held in spaced relationship by upper and lower grid plates 20 and 22, respectively. Referring to FIGURES 5 and 6 each of the fuel elements 18 is formed of an elongated tube or body 24. The ends of the tube are provided with top and bottom end fixtures 26 and 28, respectively, which are welded tightly to the tube 24. The top end fixtures 26 are designed so as to be engageable by a co-acting lifting means (not shown), which is disposed above the tank, for vertically removing the fuel elements from the reactor core.

Centrally disposed within the tube 24 is a solid body 30 composed of a homogeneous mixture of uranium 235, zirconium hydride and uranium 238. The upper and lower portions of the tube 24 of each fuel element 18 preferably contain suitable reflecting and moderating material 34, such as graphite.

As seen in FIGURES 5 and 6 the fuel elements 18 extend in a generally vertical direction and are generally uniformly spaced on concentric circles. The illustrated reactor provides positions for 86 fuel elements, any unused positions being occupied by dummy elements which are generally similar in outer construction to the fuel elements. The dummy elements are essentially filled with a suitable reflecting material, such as graphite. It should be understood that the number of fuel elements as compared to dummy elements will vary considerably, depending upon the general design and dimensions of the reactor and the particular arrangement of the fuel elements.

The fuel elements 18 are maintained in suitable spaced relationship, as heretofore indicated, by means of the pair of vertically spaced, transversely extending perforated grid plates 20 and 22. The grid plates 20 and 22 are held in spaced apart relationship by a tubular shroud 36 which surrounds the fuel elements, the grid plates 20 and 22 being suitably attached thereto. The distance between the grid plates is such that the bottom end fixture 28 of each fuel element rests on the lower grid plate 22 and the upper grid plate 20 is disposed just above the upper ends of the fuel elements 18.

The lower grid plate 22 is provided with a plurality of circular holes 38 extending therethrough (see FIGURE 5) which have their centers on concentric circles and which are suitably countersunk to slidably receive the bottom end fixtures 28 of the fuel elements 18.

The upper grid plate 20 is also provided with a plurality of holes 40 extending therethrough which are aligned with the holes in the lower grid plate 22. The diameter of the holes in the upper grid plate 20 are made so as to slidably accommodate the tubular body of the fuel elements 18. All of the weight of the fuel elements 18 is supported by the lower grid plate 22 with the upper grid plate 20 only acting to position the upper portions of the fuel elements 18.

A spacer 42 which encircles and is secured to the lower end of the top end fixture 26 of each fuel element provides a passage for the flow of liquid through the upper grid plate 20 while at the same time preventing the upper end of the fuel element from wobbling. The spacer 42 has a transverse cross section of an equilateral triangle with rounded corners.

A plurality of apertures 44 are provided in the shroud immediately above the lower grid plate to permit water to flow by natural convection into the core during operation of the reactor. The convectional flow of the water serves as a coolant for the core of the reactor.

In the illustrated embodiment each of grid plates 20 and 22 has 91 holes drilled therein, 86 of which may be used as fuel element positions. As described previously, dummy fuel elements are inserted in any unused fuel element positions. Normally, fuel elements are positioned near the center of the core and the dummy elements are placed near the outside of the core. The remaining holes are used for control rod assemblies, and a neutron source (not shown).

Control rod assemblies are provided in the core for starting up the reactor, operating it at some desired position, pulsing the reactor (i.e., instantaneously raising the power of the reactor to a very high level), stepping the reactor (i.e., raising the power level to some arbitrary level for a given interval of time), and shutting the reactor down when desired. In general, a control rod assembly includes a rod of material having a large capture cross section for thermal neutrons such as cadmium, boron or boron carbide. Normally, a control rod is rated according to the reduction of reactivity that occurs when it is fully inserted into the reactor core.

In the illustrated embodiment four control rod assemblies, 46, 48, 50 and 52 are provided, three of which, 46, 48, and 50 are symmetrically located in the core. The fourth control rod assembly 52 is located in the center of the core 10. The three control rod assemblies 46, 48, and 50 are driven by separate conventional control rod drive mechanisms 54 supported above the reactor tank, as hereinafter described. The control rod drive mechanisms 54 are controlled so that one of the control rod assemblies 46, 48, and 50 serves as a regulating rod and the other two serve as safety rods, whereby both accuracy and range of control is achieved.

In the illustrated embodiment, the three control rod assemblies 46, 48, and 50 are similar in construction, and each includes a control rod (not shown) which slides vertically within a guide tube 56. The guide tube 56 is supported in the reactor core 10 by the upper grid plate 20 and is kept from wobbling by the lower grid plate 22. The particular construction of the three control rod assemblies 46, 48, and 50 is not an important feature of this invention and, hence, is not described herein in detail.

In the illustrated embodiment, the center control rod assembly 52 serves as both a shim safety and a transient control rod. The control rod assembly 52 includes a control rod (not shown) which slides in a guide tube 58. The guide tube 58 is supported by the upper grid plate 20 and is prevented from wobbling by the lower grid plate 22.

Figure 4:
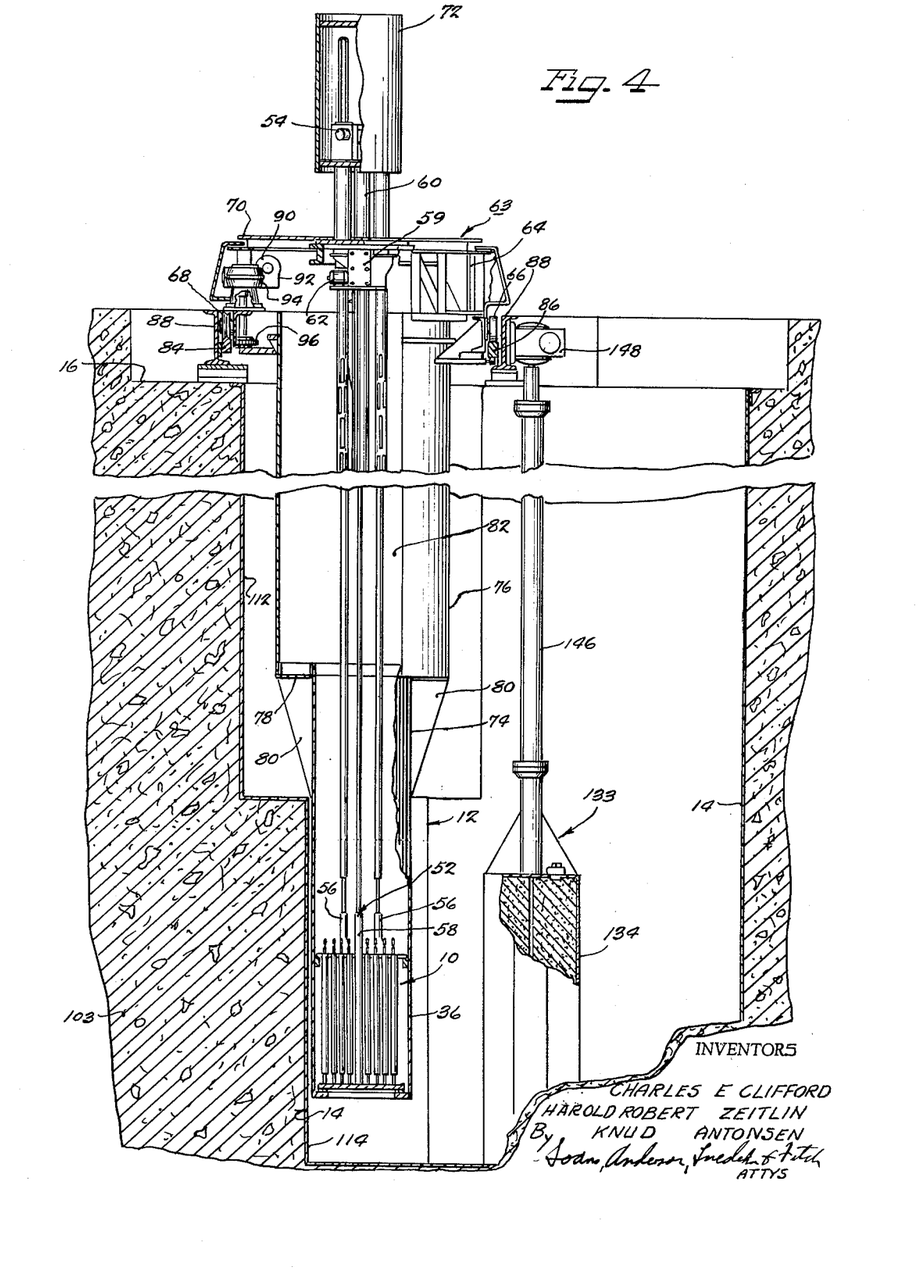
FIGURE 4 is a vertical cross sectional view taken generally along line 4—4 of FIGURE 3 with the doors being shown in an open position.

The shim safety-transient control rod 52 is driven by a drive unit 59 supported above the reactor tank. As shown in FIGURE 4, the drive unit 59 includes a vertically extending cylinder 60 which is supported for vertical movement above the reactor tank and an air operated piston (not shown) disposed within the cylinder, which piston is connected to the control rod. The cylinder 60, is positioned vertically relative to the core by a variable speed motor 62 which drives a ball nut lead screw mechanism (not shown) connected to the cylinder. The stroke of the piston and hence the movement of the control rod, is determined by the position of the cylinder 60.

In its de-energized position the control rod is completely within the reactor core 10 and is held there by gravity. Application of pressurized air causes a rapid withdrawal of the control rod a distance determined by prior positioning of the cylinder 60. Thus, with this drive unit 59 any amount of the control rod may be withdrawn from zero to the full rod worth.

The core 10 of the reactor is movably supported by a carriage 63 positioned above the reactor tank 12. As illustrated particularly in FIGURES 3 and 4, the carriage 63 is generally rectangular in shape and includes a framework 64 fabricated of suitable structural shapes, two pairs of wheels 66 and 68 rotatably carried by the framework 64, and a housing 70 of suitable sheet metal disposed over the framework 64. The control rod drive mechanisms 54 are disposed above the carriage 63 and are suitably supported by the framework 64. The control rod drive mechanisms 54 are enclosed by a cylindrical housing 72. The drive unit 59 is suitably supported by the framework 64.

As shown in FIGURE 4, the core 10 is positioned directly below the carriage 63, and a vertically extending, tubular extension 74 of the shroud 36 is connected to the framework 64 of the carriage 63 by a vertically extending tubular support member 76. The upper end of the support member 76 is suitably connected to the framework 64.

The tubular support member 76 is made larger in diameter than the shroud 36 in order to permit access to the top of the core 10 for fuel loading and experimentation. The support member 76 is connected to the shroud extension 74 by a ring 78 extending horizontally between the support member 76 and the shroud extension 74. Suitable gusset plates 80 are connected between the ring 78 and the shroud extension 74. The horizontal ring 78 is provided with apertures (not shown) to permit water to flow from the core 10. A vertically extending slot 82 is provided in the support member 76 so as to allow easy access to the core region.

In the illustrated embodiment, the carriage 63 is guided and supported above the reactor tank by a pair of parallel, horizontally extending guide rails 84 and 86, the center line of the pair of rails being disposed along the minor axis of the reactor tank 12. Each of the rails 84 and 86 extends along and is fixedly connected to the inside surface of the web of an I-beam 88, the upper inner flange of which has been removed. The I-beams 88 extend across the reactor tank 12, and the ends thereof are secured to the shelf 16.

One of the rails 84 (the left hand rail in FIGURE 4) is provided with an upper portion which is generally triangular in vertical cross section. The upper portion is engaged by corresponding grooves in one pair of the wheels 68 on the carriage 63. In this way the carriage 63 is prevented from moving transversely of the rails. The other rail 86 (the right hand rail in FIGURE 4) is provided with a flat upper surface which is rollingly engaged by the other pair of wheels 66 on the carriage.

Figure 3:
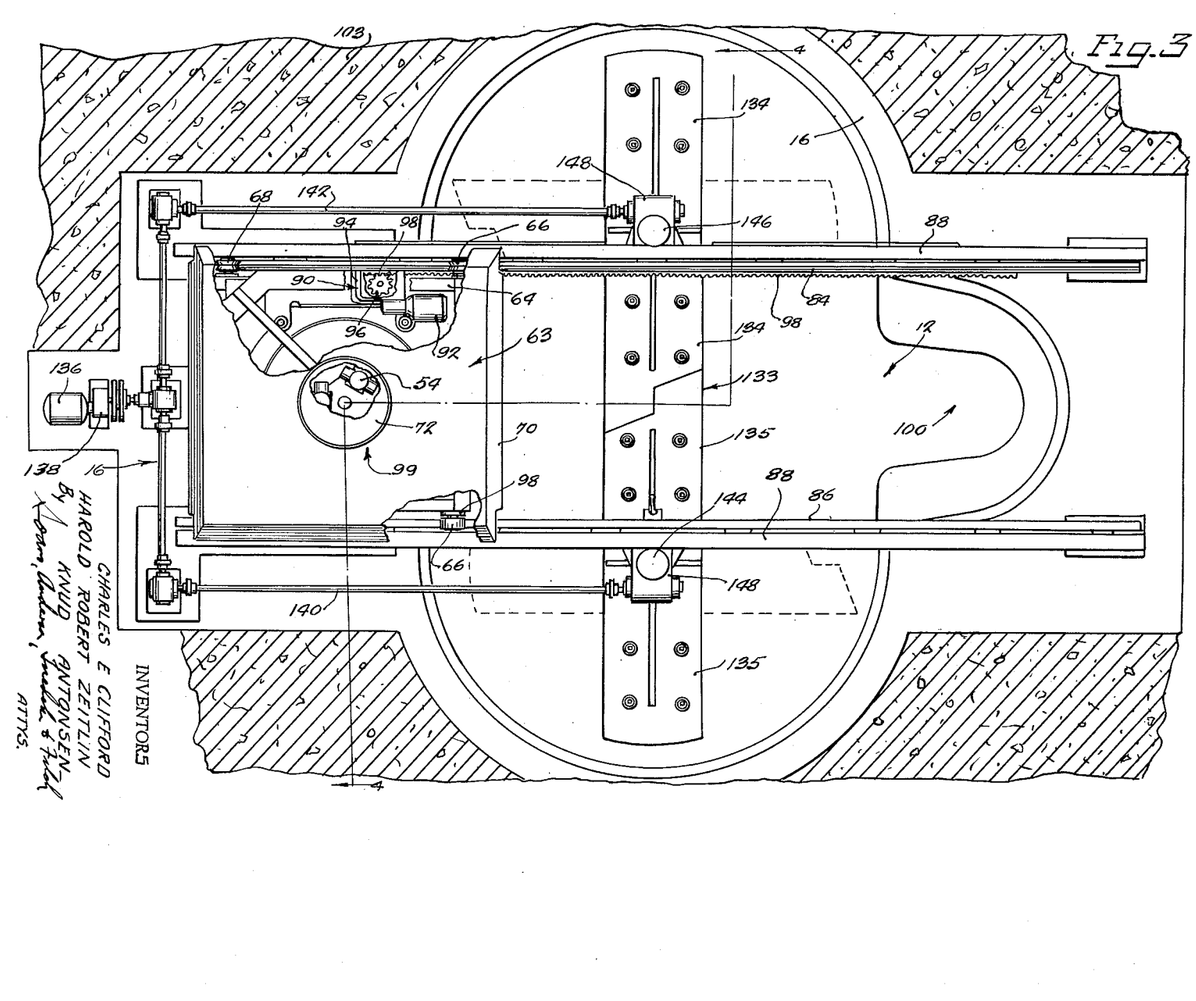
FIGURE 3 is an enlarged fragmentary plan view of a portion of the reactor system shown in FIGURE 1, with portions being broken away to show certain features thereof.

Means 90 are provided on the carriage for moving the carriage 63 along the rails. As shown in FIGURES 3 and 4, the carriage moving means 90 includes an electric, reversible motor 92 and a reduction gear drive 94 mounted on the framework 64. Driving force is transmitted through a pinion 96 to a rack 98 suitably attached to the inside surface of the left hand rail 84. The motor 92 may be controlled from a remote console (not shown).

In the illustrated embodiment, the core 10 is moved between two positions 99 and 100 disposed at opposite ends of the reactor tank 12 along the minor axis thereof. In these positions, 99 and 100, the core is respectively disposed so that radiation therefrom enters adjacent irradiation facilities 101 and 102. The facilities 101 and 102 are in the form of generally rectangular rooms, one wall of each room being adjacent the reactor tank.

One room 101 is employed to irradiate objects with fast or core neutrons (hereinafter referred to as the fast neutron exposure room). The other room 102 is employed to irradiate objects with slow or moderated neutrons (hereinafter referred to as the thermal neutron exposure room).

Both rooms 101 and 102 are shielded by shielding material 103 which in the illustrated structure is concrete. The six surfaces of the fast neutron exposure room 101 are covered with wood lining 104 in order to minimize the effects of induced secondary radiation in the concrete shielding 103 of this room. The floors of both rooms 101 and 102 may be covered with a smooth material, such as epoxy resin, to facilitate washing down of contaminations which may occur during experimentations. Access to each of the rooms 101 and 102 is by means of a rolling plug door 106, the plug being stepwise tapered on all sides to prevent the escape of radiation along the sides of the door.

Figure 1:
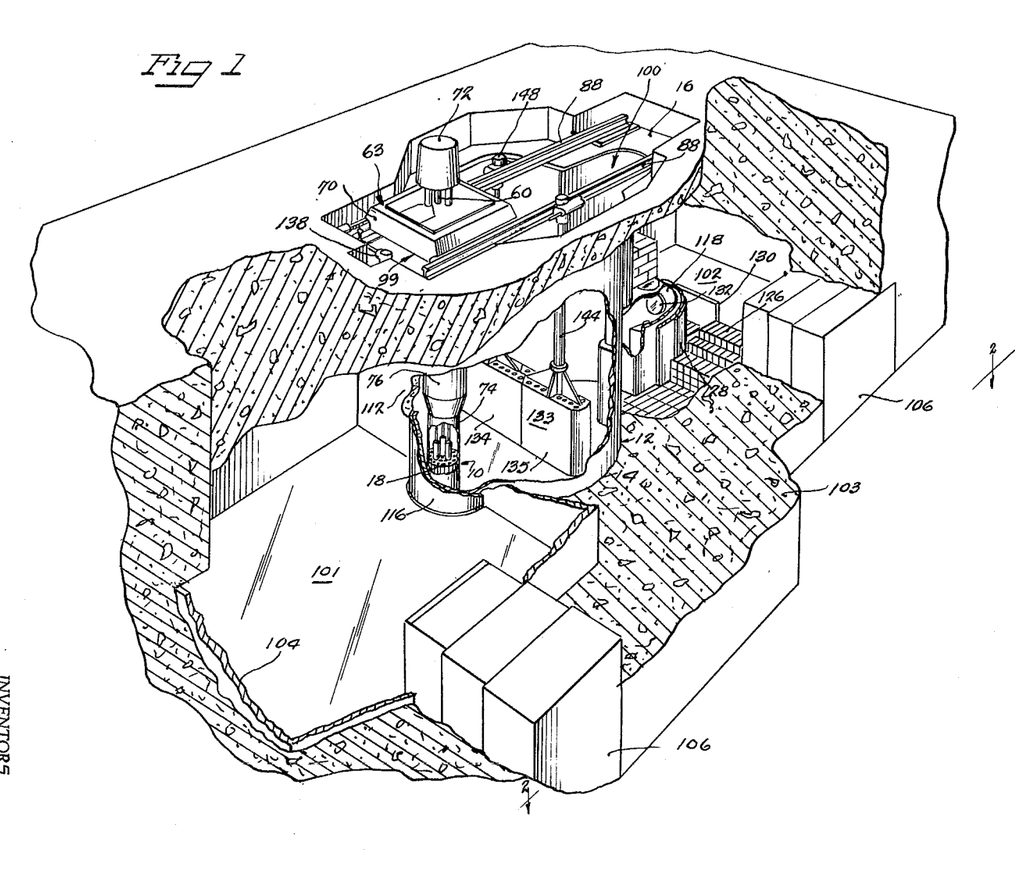
FIGURE 1 is a perspective view of a nuclear reactor system in accordance with the present invention, portions thereof being cut away to show various features thereof.
Figure 2:
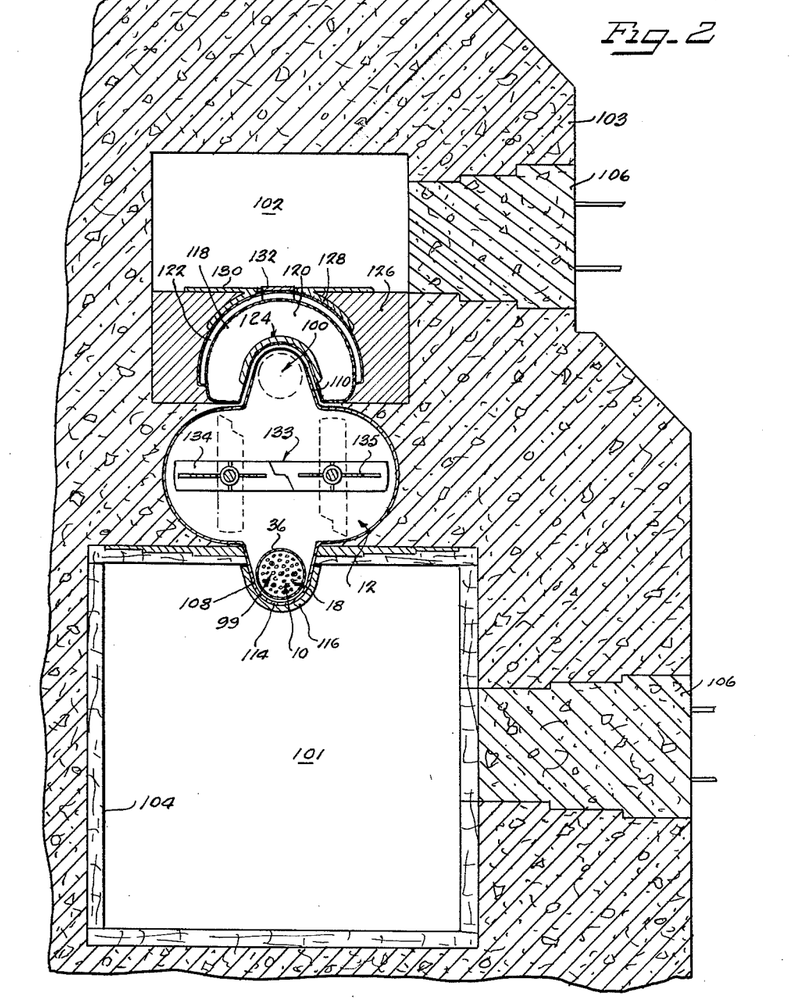
FIGURE 2 is a horizontal cross sectional view taken generally along line 2—2 of FIGURE 1.

As shown particularly in FIGURE 2, semi-cylindrical projections 108 and 110 are provided on opposite sides of the tank along the minor axis thereof, which projections 108 and 110 extend into the respective exposure rooms 101 and 102 and define semi-cylindrical areas or recesses for receiving the core 10. The portion 112 of each of the projections 108 and 110 above that which receives the core is made larger in radius than the lower or core receiving portion 114 in order to accomodate the larger diameter supporting member 76. Each core receiving portion 114 is made of a radius slightly larger in radius than that of the shroud 36. The projections 108 and 110 extend sufficiently into the respective exposure rooms 101 and 102 so that the core, when located in the respective projections, faces the exposure room over approximately 180 degrees in the horizontal plane.

As shown in FIGURE 2, the external surface of the core receiving portion 108 of the projection in the fast neutron exposure room 101 is covered with a shield 116 which serves as a filter for core gamma rays and a reflector for core neutrons. The illustrated shield 116, which is generally semicircular in shape, is composed of a shielding material, such as lead. The shield 116 is made sufficiently thick to attenuate radiation from induced activation of the reactor tank walls so as to thereby permit access to the exposure room 101 when the core is in the opposite projection 110.

The shield 116 is provided with passages therein whereby the shield may be cooled by passing a coolant, such as water, therethrough, the shield 116 is mounted on a hydraulic lift (not shown) whereby the shield may be retracted into a cavity (not shown), in the floor of the fast neutron exposure room 101 so that the neutron to gamma ray ratio in the room may be varied.

Means 118 are provided between the thermal neutron exposure room 102 and the associated projection 110 for thermalizing core neutrons. As shown in FIGURE 2, the thermalizing means 118 includes a tank 120 containing heavy water, which is generally semi-cylindrical in shape and is disposed so as to completely enclose the projection 110. The tank 120 is cooled by passing water through an arcuate tank 122 attached to the wall of the heavy water tank 120 facing the exposure room 102.

In order to reduce the thickness of heavy water required to slow down core neutrons, an arcuate shield 124 of a material having a high density, such as lead, is disposed within the tank adjacent the wall thereof which encloses the projection 110. The thermal exposure room 102 is shielded from core gamma rays and core neutrons by shielding material 126, which in the illustrated embodiment includes concrete blocks stacked between the thermal neutron exposure room 102 and the reactor tank 12 and about the heavy water tank 120. Further shielding is provided between the core and the room by an arcuate lead sheet 128, which is disposed on the room facing wall of the heavy water tank 120, and a flat plate 130 of lead, which is disposed on the room facing side of concrete block 126. A port 132 is provided in the lead sheet 128 and lead plate 130 to allow the thermal neutrons to enter into the exposure room 102.

In order to permit safe access to one of the exposure rooms while the other exposure room is being irradiated, a movable radiation shield or gate 133 is provided in the reactor tank 12 between the two irradiation facilities 101 and 102. In the illustrated embodiment, the radiation shield 133 includes a pair of vertically extending doors 134 and 135 composed of shielding material, such as lead, which extend along the major axis of the reactor tank 12. The illustrated doors 134 and 135 are each constructed by filling a hollow aluminum housing with lead shot. Each of the doors 134 and 135 is supported on a central thrust bearing (not shown) mounted at the bottom of the reactor tank 12. The doors 134 and 135 meet at the minor axis of the reactor tank 12 and the gap between the doors is stepped to prevent radiation from streaming therethrough.

As shown particularly in FIGURE 3 the doors 134 and 135 are rotated by a common motor 136 and associated reduction gear drive 138 located on the horizontal shelf 16 between the tracks 84 and 86. The reduction gear drive 138 is connected through a pair of drive shafts 140 and 142 extending along the I-beams 88 to the upper end of vertically extending shafts 144 and 146, respectively, the upper ends of which are journalled in bearings 148 mounted on the I-beams 88. The lower ends of the vertical shafts 144 and 146 are centrally connected to the respective doors 134 and 135.

The thrust bearings of the doors 134 and 135 are spaced a sufficient distance apart so that when the doors 134 and 135 are rotated at right angles to their closed position the core 10 may be moved across the reactor tank 12.

The reactor core may be located at various locations in the tank by energizing the drive motor 92 on the carriage 63. When the core 10 is located in its position 99 adjacent the fast neutron exposure room 101, the core is essentially separated only by an aluminum window so that specimens in this room are exposed primarily to fast neutrons and gamma rays. If desired, the ratio of neutrons to gamma rays may be changed by moving the shield 116 into position between the core and the fast neutron exposure room.

When the core is in its position 100 adjacent the heavy water tank 120, the specimens in the thermal neutron exposure room 102 are exposed predominately to a flux of thermal neutrons. The doors 134 and 135 in the center of the tank 12 allow the core to be operated in one of these two positions while the specimens are being changed in the other exposure room.

Also the reactor core 10 may be moved slightly from its position 99 adjacent the fast neutron exposure room 101 and, in this position, the reactor core 10 may be employed to irradiate specimens lowered into the reactor tank from above the reactor.

In one embodiment of the illustrated reactor the following reactor parameters are employed.

Outer structure:
    Reactor tank ______ 14 ft. diam. (major) x 19 ft. 6 in. deep x ¼ in. thick.
    Reactor pit ________ Lined with approx. 4 ft. of concrete.

Core geometry: A cylindrical array of 85 aluminum clad fuel elements, 3 control rods, 1 transient control rod, 1 dummy (graphite) fuel element and 1 neutron source, arranged in concentric circles as follows:

| | Diameter, in. | Uniformly spaced holes | |
|---|---|---|---|
| Center | | 1 | 1 transient control rod. |
| 1st circle | 3.2 | 6 | 6 fuel elements. |
| 2nd circle | 6.3 | 12 | 12 fuel elements. |
| 3d circle | 9.4 | 18 | 15 fuel elements, 3 control rods. |
| 4th circle | 12.5 | 24 | 23 fuel elements, 1 neutron source. |
| 5th circle | 15.6 | 30 | 29 fuel elements, 1 dummy fuel element. |

The fuel elements are encompassed by a 5/16 in. aluminum shroud and the core is supported approx. 14 in. from the bottom of the reactor tank.

Fuel element specification:
    Diameter ______________________ 1.42 in.
    Length of active portion ___________ 14.0 in.
    Aluminum cladding thickness _______ .030 in.
    Weight of active portion ___________ Approx. 3200 grams.
        Hydrogen _________________ 1% by weight
        Zirconium _________________ 91% by weight
        Uranium __________________ 8% by weight
        Uranium enrichment ________ 20% $U^{235}$.
        Hydrogen atoms/zirconium atoms __ 1.0.
        Hydrogen atoms/uranium 238 atoms 37.1.
    Critical Mass ___________________ Approximately 1.95 kg. of $U^{235}$.

Reflector:
    Material
        Radial _____________ Water or water and lead.
        Axial ______________ Water and graphite (1.65 density).
    Thickness
        Radial _____________ Variable (2 in. water minimum).
        Axial ______________ 4 in. of graphite.

Nuclear characteristics:
    Average thermal neutron flux in core at 100 kw. _______________ $1.1 \times 10^{12}$ neutrons cm.$^{-2}$–sec.
    Initial excess reactivity allowance__ 2.9 percent $\delta k/k$.
    Transient reactivity insertion _____ 2.2 percent $\delta k/k$ (maximum).
    Reactivity value in control system (minimum) ___________________ 7.2 percent $\delta k/k$.
    Prompt temperature coefficient of reactivity _____________________ Approx. $-1.40 \times 10^{-4}$, $\delta k/k/°$ C. at 50° C.
    Void coefficient of reactivity in core ________________________ Approx. $-2 \times 10^{-3}$, $\delta k/k/\%$ at 20° C.
    Prompt neutron lifetime __________ Approx. 45 microseconds.

Thermal characteristics (continuous operation):
    Power __________________________ 100 kw.
    Cooling method _________________ Water circulated by natural convection.
    Refrigeration capacity ___________ 100 kw. at 90° F.
    Coolant water temperature:
        Core Inlet _________________ 30° C.
        Core Outlet _______________ 38° C.
        Coolant water flow rate _____ 13 g.p.m.
    Coolant water average velocity in core ________________________ 0.05 ft./sec.

The reactor can be operated at powers up to 1 mw. not to exceed 10 min. duration for a max. of 1 mw.-hr. per day.

Water volume in the core _______ Approximately 35 percent by volume.
Aluminum in the core __________ Approximately 8 percent by volume.

Control:
    1 Boron-carbide transient rod.
    3 Boron-carbide control rods.

Drives:
    Control rods ______________ Rack and pinion.
    Transient rod _____________ Air operated piston and motor driven ball nut lead screw with a variable speed motor.

Maximum reactivity addition rate for approach to criticality .04% $\delta k/k$/sec.
Neutron source _________________ Polonium-beryllium.
Shielding
    Radial __________________ Ordinary concrete approx. 4 ft. thick.
    Vertical _________________ 16 ft. of water above core.
    Movable shield __________ Water cooled, lead 2 in. thick and 50 inches high.
    Shield in D₂O tank _______ Lead approx. 6 in. thick.
    Doors __________________ 2-lead shot 18 in. thick, 58 inches high and 71 inches wide.

In its two extreme positions, the core is operated at a distance of approximately 2 inches from the wall of the projection. An interlocking system on the reactor is arranged to permit the core to be operated in any position within 2 feet of either of the two extreme positions. In this way it is possible to create a variety of radial reflector conditions in the reactor tank.

The reflector may be made up of any of the following combinations of water and lead (1) effectively infinite thickness of water for 180°, and 2 inches of water for the other 180°; (2) effectively infinite thickness of water for 180°, and 2 inches of water and 2 inches of lead for the other 180°; (3) effectively infinite thickness of water for 180° and 2 inches of water and 6 inches of lead for the other 180°; and (4) effectively infinite thickness of water for 360°.

To protect operating personnel from inadvertent exposure, a suitable interlocking safety system may be provided. For example, an interlocking system is provided so that the plug door on the fast neutron exposure room cannot be opened when the core is adjacent the fast neutron room or when the lead doors are open.

The reactor is designed so that it may be selectively operated at a steady state power level of 100 kw., or at 1 megawatt for a period not to exceed 10 minutes for a maximum of 1 megawatt-hour per day, or it may be pulsed with the insertion of up to 2.1% $\delta k/k$ resulting in a pulse of approximately 15 milliseconds duration and an energy release of 20 megawatt seconds.

For pulsing operation, the lead screw on the transient rod is operated until the cylinder is positioned to make available for rapid insertion up to a maximum of 2.1% $\delta k/k$ reactivity. The transient is then obtained by application of air pressure which activates the drive piston.

The transient control rod may be employed to provide a square wave pulse of power. Generally, in this type of operation, the reactor is brought up from essentially zero power to the desired power level in a fraction of a second, maintained at steady state at that power level and then brought down instantaneously. More specifically, the power level is pulsed to the desired power level by the transient control rod, and then, because the prompt negative temperature coefficient of reactivity, as well as the delayed temperature coefficient of reactivity, causes a decrease in the reactivity of the reactor as the reactor heats up, an additional reactivity insertion is made to compensate for the negative reactivity being introduced by the temperature rise of the fuel elements. This additional reactivity is inserted by means of the servo control mechanism on the conventional control rod assembly. The reactivity is inserted at such a rate as to hold the power level constant at a desired value. When the prescribed irradiation time has elapsed, the reactor is shut down automatically at a pre-set time or manually by the operator.

As can be seen from the above a reactor system is provided wherein the reactor core may be moved to separate positions within a reactor tank to permit, for example, its use in separate exposure areas and also for irradiation of specimens located in the reactor tank. The shielding doors permit personnel entry into one exposure area while the core is operating in the other exposure area.

It should be understood that the present invention is not limited to the type of reactor or to the number of facilities or their location. Various other changes and modifications may be made in the above described reactor system without deviating from the spirit or scope of the present invention.

Various features of the present invention are set forth in the accompanying claims.

What is claimed is:

1. A nuclear reactor system comprising a tank having two projections disposed at opposite ends of the tank, a fluid coolant within said tank, a first irradiation facility disposed adjacent one of said projections, a second irradiation facility disposed adjacent the other of said projections, a reactor core within said tank, a carriage, means for supporting said carriage for movement between said projections, the projections being of such a size as to receive said core, means connecting said core to said carriage so that said carriage supports said core in spaced relationship to the bottom of said tank, means on said carriage for moving said carriage on said supporting means, and a movable gate of radiation shielding material normally disposed between said projections, said gate being movable horizontally to a position which permits passage of said core between said positions.

2. A nuclear reactor system comprising a tank, a fluid coolant within said tank, a reactor core, means for supporting said core within said tank for horizontal movement between two predetermined positions, means for moving said core to and from said positions, a radiation shield disposed between said positions, said shield including a pair of doors, of radiation shielding material, means for rotatably mounting said doors, said doors being rotatable from a closed position wherein the doors meet at a line extending between said positions to an open position which permits passage of said core between said positions, and means connected to said doors for rotating the same.

3. A nuclear reactor system comprising a tank having two semicylindrical projections disposed at opposite ends of the tank, a fluid coolant within said tank, a first shielded room disposed adjacent said tank with one of said projections extending into said room, a second shielded room disposed adjacent said tank with the other of said projections extending into said second shielded room, a cylindrical reactor core within said tank, the projections being of such a size as to receive said core, a pair of parallel rails supported above said tank and extending between said projections, a carriage on said rails, means for connecting said core to said carriage so that said carriage supports said core in spaced relationship to the bottom of said tank, and motive means on said carriage for moving said carriage on said rails.

4. A nuclear reactor system comprising a tank having two semicylindrical projections disposed at opposite ends of the tank, a fluid coolant within said tank, a first irradiation facility disposed about and adjacent one of said projections, a second irradiation facility disposed adjacent the other of said projections, a cylindrical reactor core within said tank, the projections each having a slightly larger radius than the core, a pair of parallel rails supported above said tank and extending between said projections, a carriage having wheels riding on said rails, means on said rails for preventing side-wise movement of said carriage, a motive means carried by said carriage, means connecting said motive means to said rails whereby said carriage is moved along said rails by said motive means, means connecting said core to said carriage so that said carriage supports said core in spaced relationship to the bottom of said tank, and a movable radiation shield normally disposed between said projections, said shield being movable horizontally to a position which permits passage of said core between said positions.

5. A nuclear reactor system comprising a tank, a fluid coolant within said tank, a reactor core, means for supporting said core within said tank for horizontal movement between two predetermined positions, means for moving said core to and from said positions, a radiation shield disposed between said positions, said shield including a pair of vertically extending doors of radiation shielding material, a pair of thrust bearings on the bottom of said tank, one of said bearings supporting one of said doors for rotation about a center vertical axis, the other of said bearings supporting the other of said doors for rotation about a center vertical axis, a pair of vertically extending, rotatably supported shafts, one of said shafts being connected to one of said doors at its axis, the other of said shafts being connected to the other of said doors at its axis, and a power means connected to said shafts for rotating said doors to and from a closed position wherein the doors meet at a line extending between said positions and an open position which permits passage of said core between said positions.

6. A nuclear reactor system comprising a tank having two semicylindrical projections disposed at opposite ends of the tank, a fluid coolant within said tank, a first shielded room disposed adjacent said tank with one of said projections extending into said room, a second shielded room disposed adjacent said tank with the other of said projections extending into said second shielded room, a cylindrical reactor core within said tank, the projections being of such a size as to receive said core, a carriage, means for supporting said carriage for movement between said projections, means for connecting said core to said carriage so that said carriage supports said core in spaced relation to the bottom of said tank, means on said carriage for moving said carriage on said supporting means, a semicylindrical shield of radiation shielding material, means for mounting said shield for movement between a position wherein the shield is disposed about the room side of one of said semicylindrical projections to a position wherein said shield is displaced from the room side of said projection, and means for moving said shield between said positions.

7. A nuclear reactor system comprising a tank having two semicylindrical projections disposed at opposite ends of the tank, a fluid coolant within said tank, a first shielded room disposed adjacent said tank with one of said projections extending into said room, a second shielded room disposed adjacent said tank with the other of said projections extending into said second shielded room, a cylindrical reactor core within said tank, the projections being of such a size as to receive said core, a carriage, means for supporting said carriage for movement between said projections, means for connecting said core to said carriage so that said carriage supports said core in spaced relation to the bottom of said tank, means on said carriage for moving said carriage on said supporting means, and means disposed between one of the rooms and the associated projection for thermalizing core neutrons, said means including a semicylindrical tank disposed about the room side of said projection, said semicylindrical tank containing heavy water, an additional tank disposed on the wall of said semicylindrical tank which faces the one shielded room, means for circulating water through said additional tank, and an arcuate shield of a high density material disposed within the tank adjacent the wall thereof which encloses the associated projection.

8. A nuclear reactor system comprising a tank having two semicylindrical projections disposed at opposite ends of the tank, a fluid coolant within said tank, a first shielded room disposed adjacent said tank with one of said projections extending into said room, a second shielded room disposed adjacent said tank with the other of said projections extending into said second shielded room, a cylindrical reactor core within said tank, the projections being of such a size as to receive said core, a carriage, means for supporting said carriage for movement between said projections, means for connecting said core to said carriage so that said carriage supports said core in spaced relation to the bottom of said tank, means on said carriage for moving said carriage on said supporting means, means for varying the neutron to gamma ray ratio in the first shielded room, said means including a semicylindrical shield of radiation shielding material, means for mounting said shield for movement between a position wherein the shield is disposed about the room side of said one semicylindrical projection to a position wherein said shield is displaced from the room side of said projection, and means for moving said shield between said positions, and means disposed between the second shielded room and the other projection for thermalizing core neutrons, said means including a semicylindrical tank disposed about the room side of said other projection, said tank containing heavy water, an additional tank disposed on the wall of said semicylindrical tank which faces the second shielded room, means for circulating water through said additional tank, and an arcuate shield of high density material disposed within the semicylindrical tank adjacent the wall thereof which encloses the other projection.

References Cited in the file of this patent

UNITED STATES PATENTS

| | | |
|---|---|---|
| 2,875,143 | Froman | Feb. 24, 1959 |
| 3,003,941 | Drolshagen et al. | Oct. 10, 1961 |

FOREIGN PATENTS

| | | |
|---|---|---|
| 1,241,200 | France | Aug. 8, 1960 |

OTHER REFERENCES

Proceedings of the Second United Nations International Conference on the Peaceful Uses of Atomic Energy, vol. 10, Research Reactors United Nations, Geneva, 1958, pp. 232–236, 259–264.